Nov. 24, 1925.
E. ANDERSSON
1,562,672
HOLDER FOR BOLSTER STAKES FOR FREIGHT VEHICLES
Filed April 21, 1924
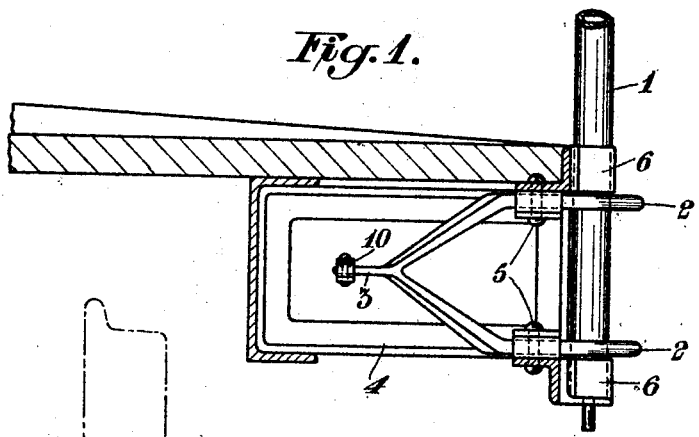
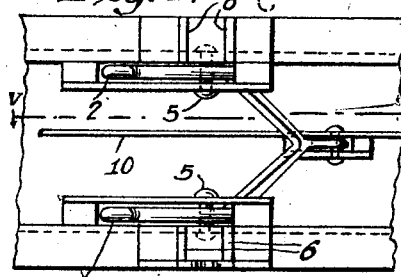 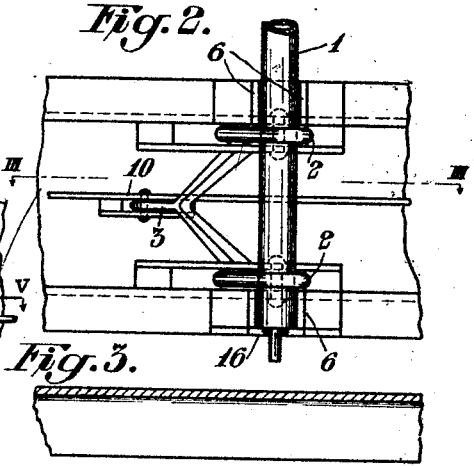
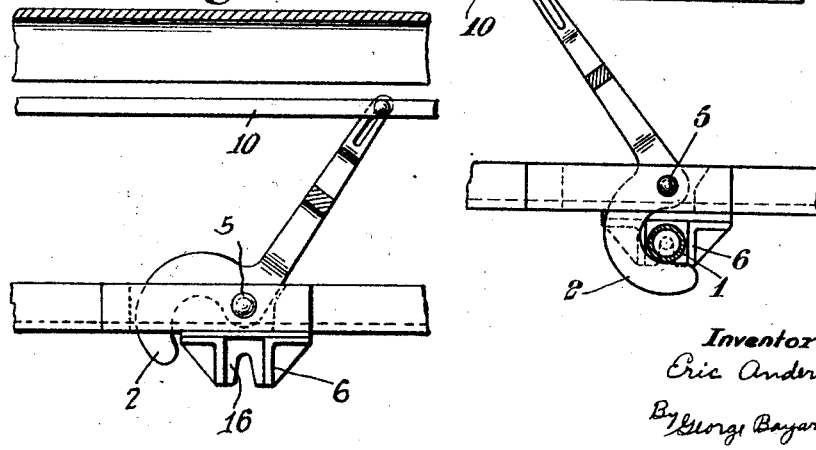
Inventor:
Eric Andersson
By George Bayard Jones
Atty.

Patented Nov. 24, 1925.

1,562,672

UNITED STATES PATENT OFFICE.

ERIC ANDERSSON, OF KRISTINEHAMN, SWEDEN.

HOLDER FOR BOLSTER STAKES FOR FREIGHT VEHICLES.

Application filed April 21, 1924. Serial No. 707,806.

*To all whom it may concern:*

Be it known that I, ERIC ANDERSSON, a subject of the King of Sweden, residing at Kristinehamn, Sweden, have invented a new and useful Improvement in Holders for Bolster Stakes for Freight Vehicles, of which the following is a specification.

The present invention relates to a holder for bolster stakes such as are used on freight vehicles, for instance freight cars and other waggons or carts, drags and the like, for retaining the load on the vehicle, particularly when the load consists of logs or the like. As is well known, a number of bolster stakes are used in such cases on the two longitudinal sides of the car or other vehicle used. It has previously been proposed to secure said bolster stakes in holders, each consisting of two members movable relatively to one another, and one of which members may be moved aside in such manner that the stake may be moved laterally out from the car without having to be moved longitudinally. In this manner it is possible rapidly to release the stakes at one side of the car, or at both sides if desired, and in this manner considerably to facilitate the unloading of the car. Such holders as heretofore used, however, are very complicated and therefore expensive, for which reasons they have not yet attained any extensive use in practice.

The purpose of the present invention is to avoid these disadvantages. The invention consists broadly in that one member of each holder consists of a socket bracket or the like secured to the frame of the car, and the two shanks or extended cheek-pieces of which enclose a stake inserted in the holder on two opposite sides, the other member of the holder consisting of a locking lever which is pivoted to the frame of the car inside the bracket in such manner that it is capable of turning on an axis parallel with the longitudinal direction of the stake inserted in the holder, and the outer portion of which is bent to the shape of a hook in such manner that it may grip around or engage the outer side of the stake inserted in the socket. In this manner an exceedingly simple and reliable holder is obtained in which at least the greater portion of the pressure of the stake on the locking lever is taken up by the pivot of said lever which may easily be made sufficiently strong for resisting said pressure. In practice it will sometimes be suitable to use two such holders, one above the other, for each stake, in which case the inner portions of the locking levers of said holders, i. e. the arms of said levers on the inner side of the turning axis may be joined to form a common lever arm.

In the accompanying drawings a suitable embodiment of the invention applied to a railway car, is shown by way of example. Fig. 1 shows the holder and its attachment to the floor of the car, viewed in the longitudinal direction of the car. Fig. 2 shows the holder viewed from the side of the car, and shows the stake inserted into place, and Fig. 3 shows a horizontal section on the line III—III in Fig. 2. Fig. 4 shows the holder in open position and viewed from one side of the car, the stake being removed, and Fig. 5 shows a horizontal section on the line V—V in Fig. 4.

In the embodiment illustrated in the drawing each stake 1 is secured by means of two holders which are supported one above the other at the edge of the car floor. Both holders are rigidly secured to the car frame 4 below the car floor. The stake 1 is shown in the drawing as being of tubular cross-section in a usual manner, and is provided with a bottom pin for inserting the stake in ordinary immovable holders, but it will be understood that the present holder may be adapted to be used for any other type of stake. Each holder consists of an open socket bracket 6 which is attached in suitable manner to the frame 4, and of a locking lever 2 pivoted to said frame by means of a rivet or pin 5 on the inside of the bracket 6, the outer portion of said lever being hook-shaped, as shown in Fig. 3, in such manner that it is capable to grip around the outer side of a stake inserted in the bracket, so that the greater portion of the pressure of the stake against the locking lever 2 is taken up by the pin 5. The lower end of the stake 1 rests upon a plate 16 secured to the lower bracket 6. When, as illustrated in the drawing, the stake 1 is provided with a bottom pin for enabling the stake to be inserted in the ordinary immovable holders the plate 16 is provided with a slot opening outwards for receiving said pin, as clearly shown in Figs. 3 and 5.

The inner arms of the locking levers 2 of the two holders are joined together on the inner side of the turning axis 5 of the levers, to form a common lever arm 3, as shown in Figs. 1 and 2. Each such lever arm 3 is pivotally and slidably connected to a slidable rod 10 extending along the entire length of the car and by means of which all lever arms 3 and thus all locking levers 2 on one side of the car may be turned to locking position. The movement of the rod 10 may be effected by means of a suitable lever or the like, not shown in the drawing, at one end of the car.

When the stakes 1 are to be attached to the car before loading the same the locking levers 2 are turned to locking position by moving the rod 10 by means of its actuating lever, which is then prefereably secured in suitable manner in such position. The stakes are afterwards inserted from above into the holders. When the car has been loaded the upper ends of the stakes may suitably be connected in pairs by means of chains across the load on the car, in order to secure the load.

The unloading may be effected to one side only, or to both sides, as circumstances may demand. In the former case it is of course only necessary to release the stakes 1 on one side of the car. When the car is to be unloaded in this manner the rod 10 is released and is moved to the right in Figs. 2 and 3, when all the locking levers 2 are turned inwards underneath the car floor to the position shown in Figs. 4 and 5. All stakes 1 on such side of the car are thus released from their respective holders and, while hanging in the chains connecting their upper ends with the corresponding stakes on the opposite side of the car, will swing upwards and outwards owing to the pressure of the logs. A great many of the logs will then roll off the car owing to their own weight, and the remaining logs may afterwards easily be rolled off in the same manner, and the load may thus be discharged very rapidly.

Again, if it is desired to unload towards both sides in which case there should of course be provided one actuating rod 10 for the holders on each side of the car, the holders are operated in the same manner as above described, and both sides may be operated simultaneously, or one after the other.

The embodiment above described and illustrated in the drawings is of course only to be regarded as an example of the invention, and it will be understood that it is capable of modification in several respects without departing from the principle and scope of the invention. For instance, in certain cases it will be sufficient to provide only one holder for each stake, provided that the holder is given such height and its locking lever such thickness that the stake obtains a secure support.

I claim:

1. In a bolster stake holder, the combination of a laterally open socket bracket having cheek-pieces adapted to enclose a stake from two opposite sides, and a locking lever pivoted on the inside of said bracket and capable of turning on an axis substantially parallel with the longitudinal direction of a stake inserted in said bracket, the outer arm of said lever being hook-shaped and adapted to engage the outer side of such stake.

2. The combination of two laterally open socket brackets having cheek-pieces adapted to enclose a stake from two opposite sides, said brackets being positioned one above the other, and two locking levers pivoted on the inside of said brackets and capable of turning on an axis substantially parallel with the longitudinal direction of a stake inserted in said brackets, the outer arms of said levers being hook-shaped and adapted to engage the outer side of such stake, and the inner arms of said levers being joined to form a common arm.

ERIC ANDERSSON.